(12) United States Patent
Dozol et al.

(10) Patent No.: US 7,763,684 B2
(45) Date of Patent: Jul. 27, 2010

(54) PHOSPHORUS DENDRIMERS, PREPARATION METHOD THEREOF AND USE OF SAME FOR THE EXTRACTION OF ACTINIDES AND LANTHANIDES

(75) Inventors: Jean-François Dozol, Pierrevert (FR); Christian Schmidt, Mahlow (DE); Pingshan Wang, Cuyahoga Falls, OH (US); Volker Bohmer, Mainz (DE)

(73) Assignee: Commissariat a l'Energie Atomique, Paris (FR)

( * ) Notice: Subject to any disclaimer, the term of this patent is extended or adjusted under 35 U.S.C. 154(b) by 939 days.

(21) Appl. No.: 10/546,465

(22) PCT Filed: Feb. 26, 2004

(86) PCT No.: PCT/FR2004/050083

§ 371 (c)(1),
(2), (4) Date: Apr. 7, 2006

(87) PCT Pub. No.: WO2004/076509

PCT Pub. Date: Sep. 10, 2004

(65) Prior Publication Data

US 2006/0205920 A1     Sep. 14, 2006

(30) Foreign Application Priority Data

Feb. 26, 2003  (FR) .................................. 03 02343

(51) Int. Cl.
*C08G 69/48*   (2006.01)
*C08G 79/04*   (2006.01)

(52) U.S. Cl. ...................... 525/420; 525/538; 977/754; 424/DIG. 16

(58) Field of Classification Search .................. 525/538
See application file for complete search history.

(56) References Cited

U.S. PATENT DOCUMENTS 4,871,779 A * 10/1989 Killat et al. .................... 521/28
6,177,414 B1 * 1/2001 Tomalia et al. ............... 514/159
6,657,081 B1 * 12/2003 Dozol et al. .................. 564/15

FOREIGN PATENT DOCUMENTS

FR          2 734 268          11/1996

(Continued)

OTHER PUBLICATIONS

Paine, R. T. "Preorganized and Immobilized Ligands for Metal Ion Separations". Department of Energy, Office of Basic Energy Sciences. Division of Chemical Sciences. Grant No. DE-FG03-94ER 14446. Final Report.*

(Continued)

*Primary Examiner*—Randy Gulakowski
*Assistant Examiner*—Mike Dollinger
(74) *Attorney, Agent, or Firm*—Nixon Peabody LLP (57) ABSTRACT

The invention relates to novel phosphorus-containing dendrimers having a core, at least one generation and an external layer consisting, completely or partly, of identical or different units, the said units satisfying the following formula (I):

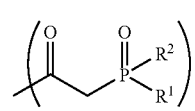

(I)

in which $R^1$ and $R^2$, which may be identical or different, are alkyl, alkoxy or aryl groups.

These dendrimers are used for extracting actinides and lanthanides from aqueous solutions containing them.

13 Claims, 5 Drawing Sheets

FOREIGN PATENT DOCUMENTS

| | | |
|---|---|---|
| FR | 2 801 592 | 6/2001 |
| WO | WO 0031087 A1 * | 6/2000 |
| WO | WO 00/53009 | 9/2000 |
| WO | WO 02/078110 A2 | 10/2002 |

OTHER PUBLICATIONS

Publication date of Paine document.*

Holister et al. Paul Holister, Cristina Roman Vas and Tim Harper. Cientifica: Technology White Papers nr. 6. "Dendrimers". Oct. 2003. Evidentiary Document.*

Wang et al. Pingshan Wang, Mohamed Saadioui, Christian Schmidt, olker Bohmer, Valery Host, Jean Francois Desreuxb and Jean-Francois Dozol. Dendritic octa-CMPO derivatives of calix[4]arenes. Tetrahedron 60 (2004) 2509-2515. Available online on Feb. 11, 2004 at www.sciencedirect.com.*

Examiner's STN search in Registry and CAPlus.*

Paine, R. T. "Preorganized and Immobilized Ligands for Metal Ion Separations". Department of Energy, Office of Basic Energy Sciences. Division of Chemical Sciences. Grant No. DE-FG03-94ER 14446. Final Report. Publication Date: Dec. 1, 1997.*

Publication of Paine Document. Dec. 1, 1997.*

Examiner's STN search in Registry and CAPlus. Mar. 18, 2009.*

* cited by examiner

PHOSPHORUS DENDRIMERS, PREPARATION METHOD THEREOF AND USE OF SAME FOR THE EXTRACTION OF ACTINIDES AND LANTHANIDES

CROSS-REFERENCE TO RELATED APPLICATION

This application claims priority based on International Patent Application No. PCT/FR2004/050083, entitled "Phosphorous Dendrimers, Preparation Method Thereof and Use of Same for the Extraction of Actinides and Lanthanides" by Jean-Francois Dozol, Christian Schmidt, Pingshan Wang and Volker Bohmer, which claims priority of French Application No. 03/02343, filed on Feb. 26, 2003, and which was not published in English.

TECHNICAL FIELD

The subject of the present invention is novel dendrimers, their method of preparation and their use for the extraction of metals, such as actinides and lanthanides.

More particularly, the invention relates to dendrimers that include phosphorus-containing functional groups that have useful properties for the extraction of metals, such as lanthanides and most particularly actinides.

These novel dendrimers can therefore be used for extracting metals such as actinides, these being present in aqueous solutions such as the aqueous effluents coming from spent nuclear fuel reprocessing plants or spent nuclear fuel dissolution solutions.

PRIOR ART

Dendrimers are macromolecules consisting of monomers that are combined around a central core according to a tree-forming process.

Figure 1:
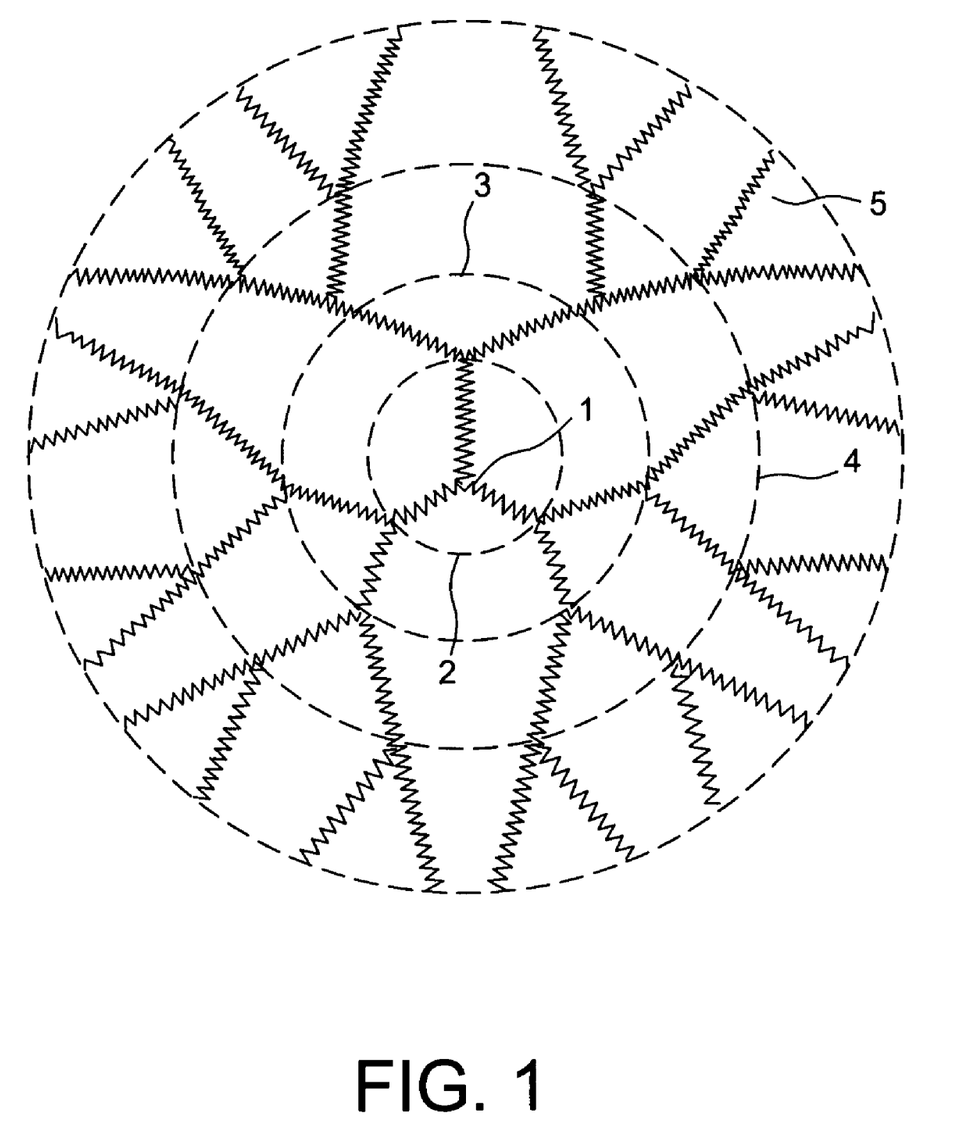
FIG. 1, already described, is a diagram showing the general structure of a dendrimer.

Thus, FIG. 1 shows the general structure of one particular dendrimer having the following parts:
- a core (or central layer) identified by reference 1 in FIG. 1, formed either from a single atom or from a defined collection of atoms forming a group (for example $NH_2$), a heterocycle or even a macrocycle;
- one or more generations extending from the core towards the periphery, identified in the figure by references 2, 3, 4 denoting the 1st generation, the 2nd generation and the 3rd generation respectively, each generation consisting of a collection of units bonded covalently to the core as regards the first generation, and to the previous generation as regards the other generations; and
- an external layer identified by the reference 5, comprising peripheral units bonded covalently to the units of the last generation, the said peripheral units usually giving the functionality to the dendrimer molecule.

Two types of synthesis methods may be employed to obtain such molecules:
- divergent synthesis taking place from the core towards the periphery, by grafting an increasingly large number of molecules onto the multifunctionalized surface of the dendrimer; and
- convergent synthesis consisting in constructing the dendrimer from the periphery towards the core using dendritic fragments called dendrons that are attached during a final step to the multifunctional core.

Thus, thanks to their structure (ordered polyfunctional polymers) and to their particular properties associated with the presence of a large number of functionalities at their ends, dendrimers have many applications, especially in the field of catalysis, as catalyst supports, and in the pharmaceutical field, as agents for freeing active principles.

SUMMARY OF THE INVENTION

The subject of the present invention is novel phosphorus-containing dendrimers having very advantageous performance characteristics in the field of metal extraction, especially for metals such as lanthanides and most particularly actinides.

These phosphorus-containing dendrimers comprise, according to the invention, a core, at least one generation and an external layer consisting, completely or partly, of identical or different units, the said units satisfying the following formula (I):

in which $R^1$ and $R^2$, which may be identical or different, are alkyl, alkoxy or aryl groups.

Thus, the association of the dendrimer-type tree structure with units of formula (I) around the periphery makes the resulting molecules particularly effective for extracting metals, particularly actinide metals.

In the above formula (I), the $R^1$ and $R^2$ groups may be alkyl groups. According to the invention, these alkyl groups may be linear or branched alkyl groups preferably having from 1 to 20 carbon atoms, such as the methyl, ethyl, n-propyl, i-propyl, n-butyl and i-butyl groups.

The $R^1$ and $R^2$ groups may also be alkoxy groups. These groups may be linear or branched having, for example, from 1 to 20 carbon atoms, such as methoxy and ethoxy groups.

The $R^1$ and $R^2$ groups may also be aryl groups. The aryl groups which can be used for $R^1$ and $R^2$ are monovalent groups derived from an aromatic ring, such as a benzene ring, or a heterocyclic ring by the removal of a hydrogen atom from one of the carbon atoms of the ring. As examples of such groups, mention may be made of the phenyl, naphthyl, pyridyl and thiophenyl groups.

Preferably, the $R^1$ and $R^2$ groups each represent a phenyl group or an alkoxy group preferably having from 1 to 18 carbon atoms.

Particular dendrimers according to the present invention have a core consisting of a unit satisfying one of the following formulae, (II) or (III):

in which $m_1$ is an integer ranging from 2 to 4, and having n generations consisting of identical or different units, n being an integer ranging from 1 to 10, the said units satisfying the following formula (IV):

(IV)

in which:
  $m_2$ is an integer ranging from 1 to 4;
  when n is greater than 1, $R^3$ represents a single bond as regards the (n−1) first generations and represents a hydrogen atom as regards the $n^{th}$ generation, that is to say the last generation; and
  when n is equal to 1, $R^3$ represents a hydrogen atom.

Other particular dendrimers may have a core of formula —NH$_2$ and n generations consisting of units of formula (IV), n and the units satisfying the same definition as that given in the previous paragraph. An example of such a dendrimer is given in Example 6 in the experimental part of the description below.

More explicitly, the units constituting the (n−1) first generations (when n is greater than 1) satisfy the following formula (4a):

(4a)

More explicitly, the units of the $n^{th}$ generation (called the "final generation" when n is greater than 1 or called the "single generation" when n is equal to 1) satisfy the following formula (4b):

(4b)

Figure 2:
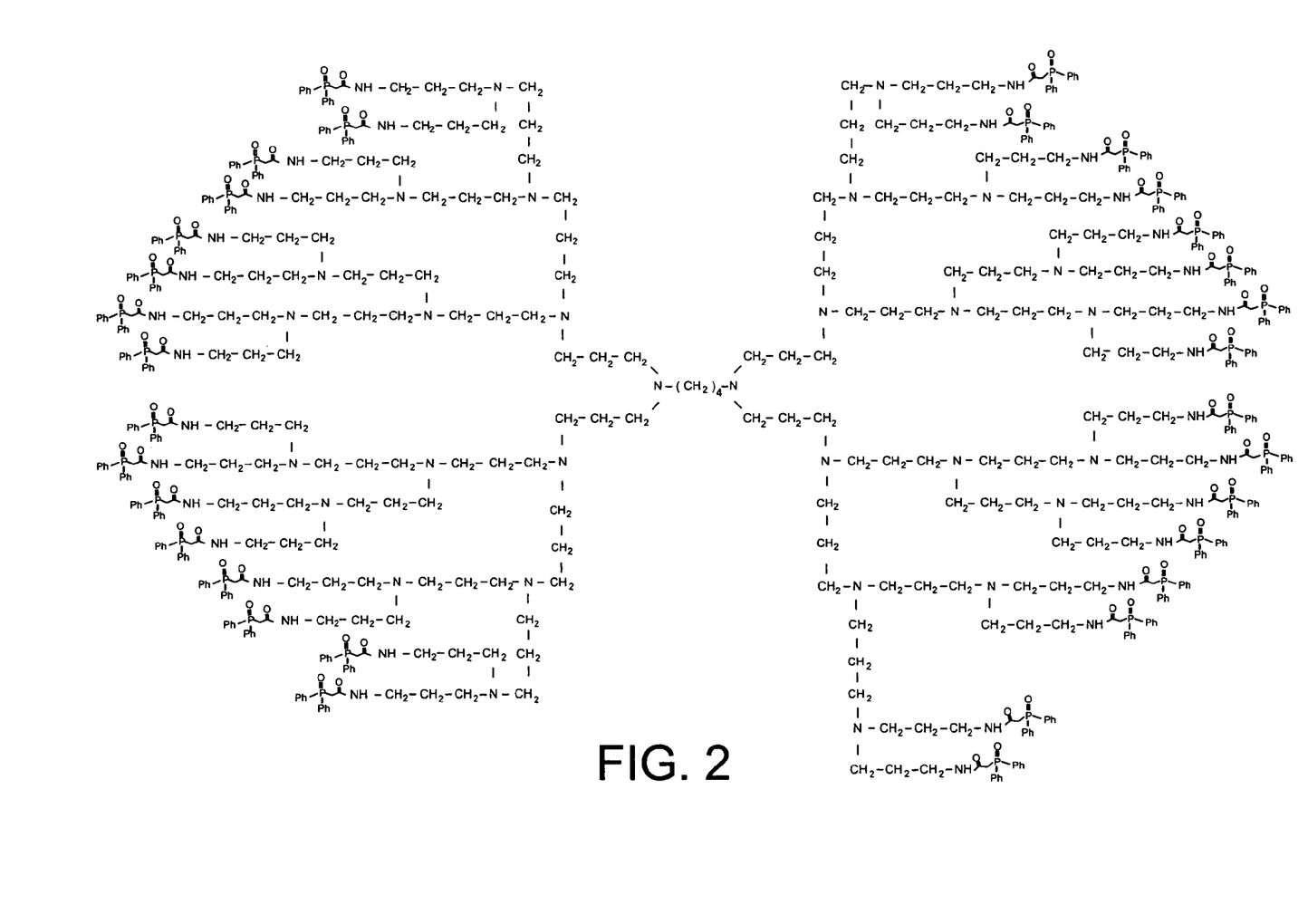
FIGS. 2 and 3, already described, show the formulae of dendrimers according to the invention.

One particular dendrimer satisfying the above definition is shown in FIG. 2 appended hereto.

FIG. 2 shows a dendrimer comprising a core of formula according to formula (III) with $m_1$ equal to 4, four generations according to formula (IV) (i.e. n equal to 4) with $m_2$ equal to 3 and an external layer consisting of units according to formula (I) with $R^1$ and $R^2$ representing a phenyl group (shown symbolically by Ph in FIG. 2). More specifically, bonded covalently to the core of formula:

are four units of the following formula:

these four units constituting the first generation of the dendrimer. Covalently bonded to each of the nitrogen atoms of the units constituting the first generation are two units of the formula as explained above, the combination of the units (6 in number) thus bonded constituting the second generation. Likewise, covalently bonded to each of the nitrogen atoms of the units constituting the second generation are two units of the formula as explained above, the combination of the units (12 in number) thus bonded constituting the third generation. Finally, the last generation consists of units of formula:

the said units being covalently bonded to the nitrogen atoms of the third generation, the nitrogen atoms of the last generation being covalently bonded to the units of formula:

According to the present invention, other particular dendrimers have a core consisting of a unit satisfying the following formula (II):

(II)

and having n generations consisting of identical or different units, n being an integer ranging from 1 to 10, the said units satisfying the following formula (V):

(V)

in which:
  $m_3$ is an integer ranging from 2 to 5;
  $m_4$ is an integer ranging from 2 to 5;
  when n is greater than 1, $R^4$ is a single bond as regards the (n−1) first generations and a hydrogen bond as regards the $n^{th}$ generation (called the last generation); and
  when n is equal to 1, $R^4$ represents a hydrogen atom.

For example, $m_3$ and $m_4$ may be equal to 3.

More explicitly, the units constituting the (n−1) first generations (that is to say when n is greater than 1) satisfy the following formula (5a):

(5a)

More explicitly, the units constituting the $n^{th}$ generation (called the "last generation" when n is greater than 1 or called the "single generation" when n is equal to 1), satisfy the following formula (5b):

(5b)

Figure 3:
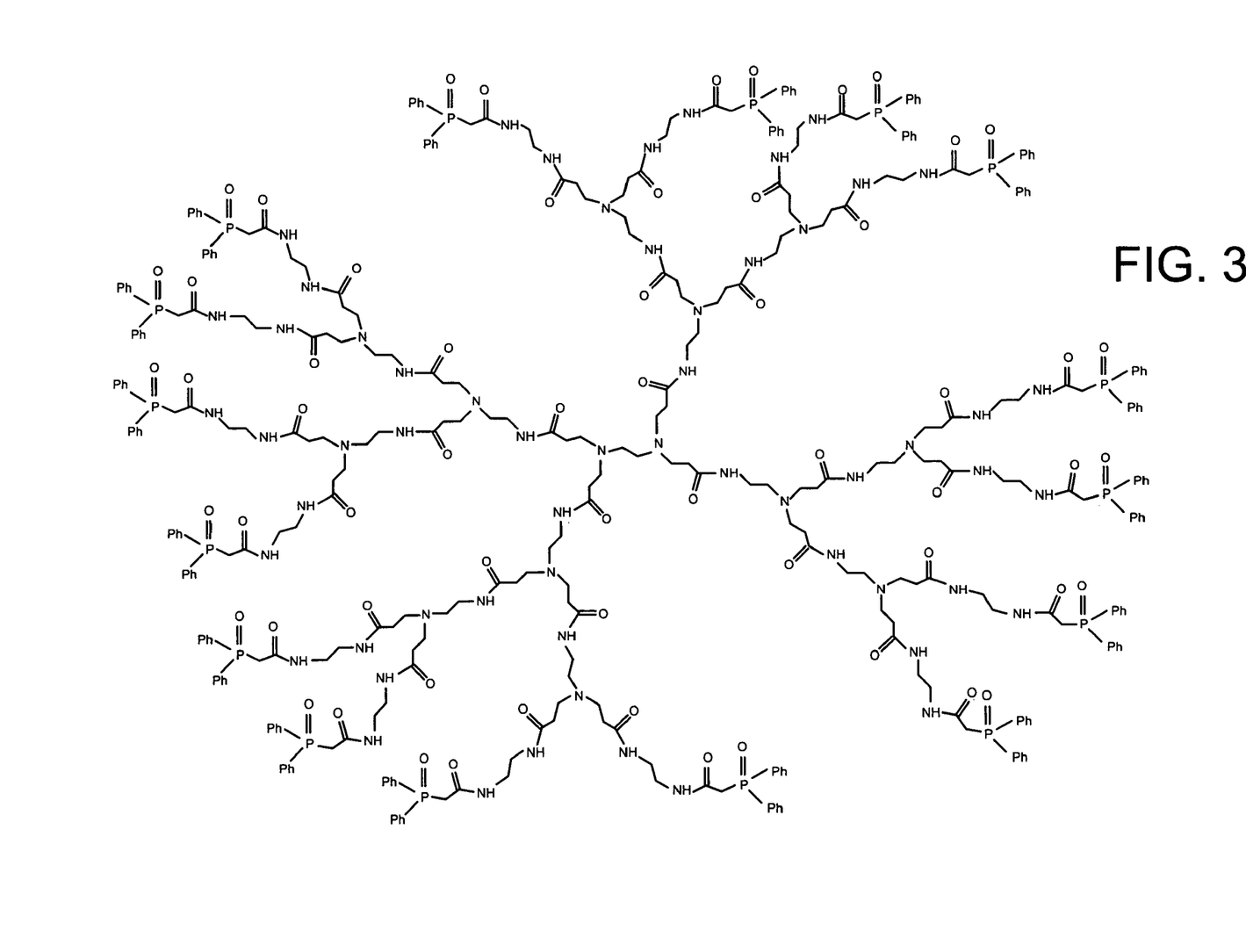

A dendrimer according to the present definition is shown in FIG. 3.

In this figure, the dendrimer shown comprises a core of formula (II), three generations (i.e. n equal to 3) comprising units according to formula (V) with $m_3$ and $m_4$ equal to 2, and an external layer consisting of units according to formula (I) with $R^1$ and $R^2$ representing phenyl groups (shown symbolically by Ph in FIG. 3).

Particular dendrimers according to the definition of the invention may be grafted (that is to say bonded via a covalent bond) onto a functionalized mineral particle, that is to say a particle whose surface has groups capable of forming a bridge between the mineral particle and reactive functional groups of the dendrimers of the invention (such as amine functional groups).

Advantageously, such particles may be silica particles having, on their surface, before grafting, $CO_2H$, triazinyl, in particular dichlorotriazinyl, or epoxide groups. Such particles are sold by Micromod. After grafting with such particles, units are formed that form bridges between the particle and the dendrimer, the said bridge-forming units satisfying the respective formulae —CO—, -triazine-, -monochlorotriazine- and —CHOH—CH$_2$.

An example of a grafted dendrimer is given in Example 6, this dendrimer being represented by the formula:

The dendrimers of the present invention may be prepared by a method that includes a step consisting in making a base dendrimer react with a compound of the following formula (VI):

(VI)

in which $R^1$ and $R^2$ are as defined above, $R^5$ represents H, a p-nitrophenyl group or a 2,4-dinitrophenyl group, the said base dendrimer including an external layer consisting of units having a terminal functional group capable of reacting with the said compound of formula (VI) so as to form a dendrimer that includes an external layer comprising units of formula (I) as defined above.

The compound of formula (VI) used in the context of this method may be prepared from an alkyl phosphinite corresponding to the following formula (VII):

(VII)

in which $R^1$ and $R^2$ have the meanings given above and $R^6$ is an alkyl group possessing, for example, from 1 to 4 carbon atoms, by reaction of the latter with ethyl bromoacetate, followed by a hydrolysis (in order to form the compound with $R_5$ representing H) and by an optional esterification of the acid obtained with p-nitrophenol or 2,4-dinitrophenol.

Preferably, the reaction between the base dendrimer and the compound of formula (VI) is carried out in the presence of a catalyst, such as triethylamine, and optionally of a coupling activator, such as dicyclohexylcarbodiimide.

Advantageously, the reaction between the base dendrimer and the compound of formula (VI) is carried out on a support that is preferably in the form of functionalized silica particles such as those defined above, the base dendrimer being grafted onto the surface of the particle. The advantage of using such a support within the context of the method lies in the fact that it is easier at the end of the method to separate the dendrimer obtained from the reaction mixture when the dendrimer is grafted onto the particles, it being possible for the separation to be carried out by simple filtration.

The functional groups capable of reacting with the compound of formula (VI), constituting the terminal functional groups of the base dendrimer, are advantageously nucleophilic functional groups capable of being added to the CO group of the phosphorus-containing compound (VI), this addition being followed by elimination of the —OR$_5$ group.

Within the context of this invention, such a functional group is preferably NH$_2$.

Such base dendrimers having such functional groups may be any type of dendrimer and especially commercial dendrimers.

As examples, mentioned may be made, as base dendrimers, of the dendrimers sold by Aldrich, such as polypropyleneimine octaamine, hexacontamine, dotriacontamine or tetrahexacontamine. For example, the dotriacontamine dendrimer has, as external layer, a ring of 32 primary amine functional groups, the said amine functional groups being capable of reacting with the above phosphorus-containing compound of formula (VI), to give after reaction, an external layer consisting of a ring of units of formula (I).

The reaction of the abovementioned dotriacontamine compound with the compound (VI) (with $R^1$ and $R^2$ representing phenyl groups) gives the dendrimer shown in FIG. 2.

Mention may also be made, as base dendrimer, of the dendrimers synthesized by Dendritech, such as the dendrimers of the polyamidoamine (PAMAM) type. An example of a 3rd generation dendrimer of this type, after reaction with the compound of formula (VI), is shown in FIG. 3. These dendrimers may also be produced synthetically, the reaction scheme for which is shown in FIG. 4.

According to this particular synthesis scheme, the first generation of the base dendrimer is synthesized as follows:

1,4-Michael addition reaction between ammonia and methyl acrylate in methanol in order to obtain compound (a); and reaction between compound (a) obtained above and ethylenediamine in methanol in order to obtain compound (b).

Figure 4:
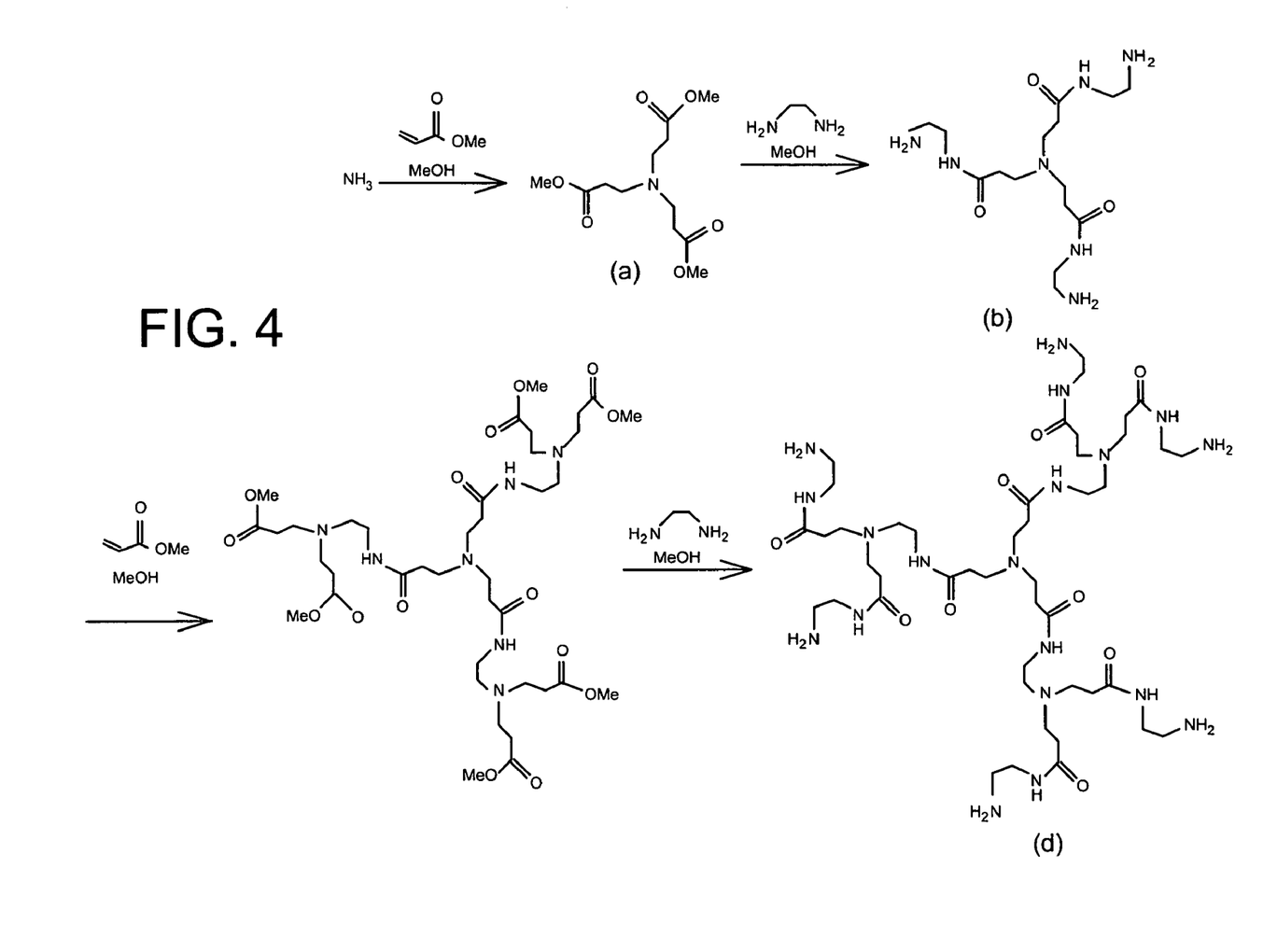
FIGS. 4 and 5, already described, show synthesis schemes for obtaining dendrimers serving as base dendrimers for the synthesis of dendrimers according to the invention.

Compound (b) called a first-generation compound, having primary amine functional groups around the periphery, can again undergo the abovementioned two reactions to give a second-generation compound (d), such as that shown in FIG. 4.

Figure 5:
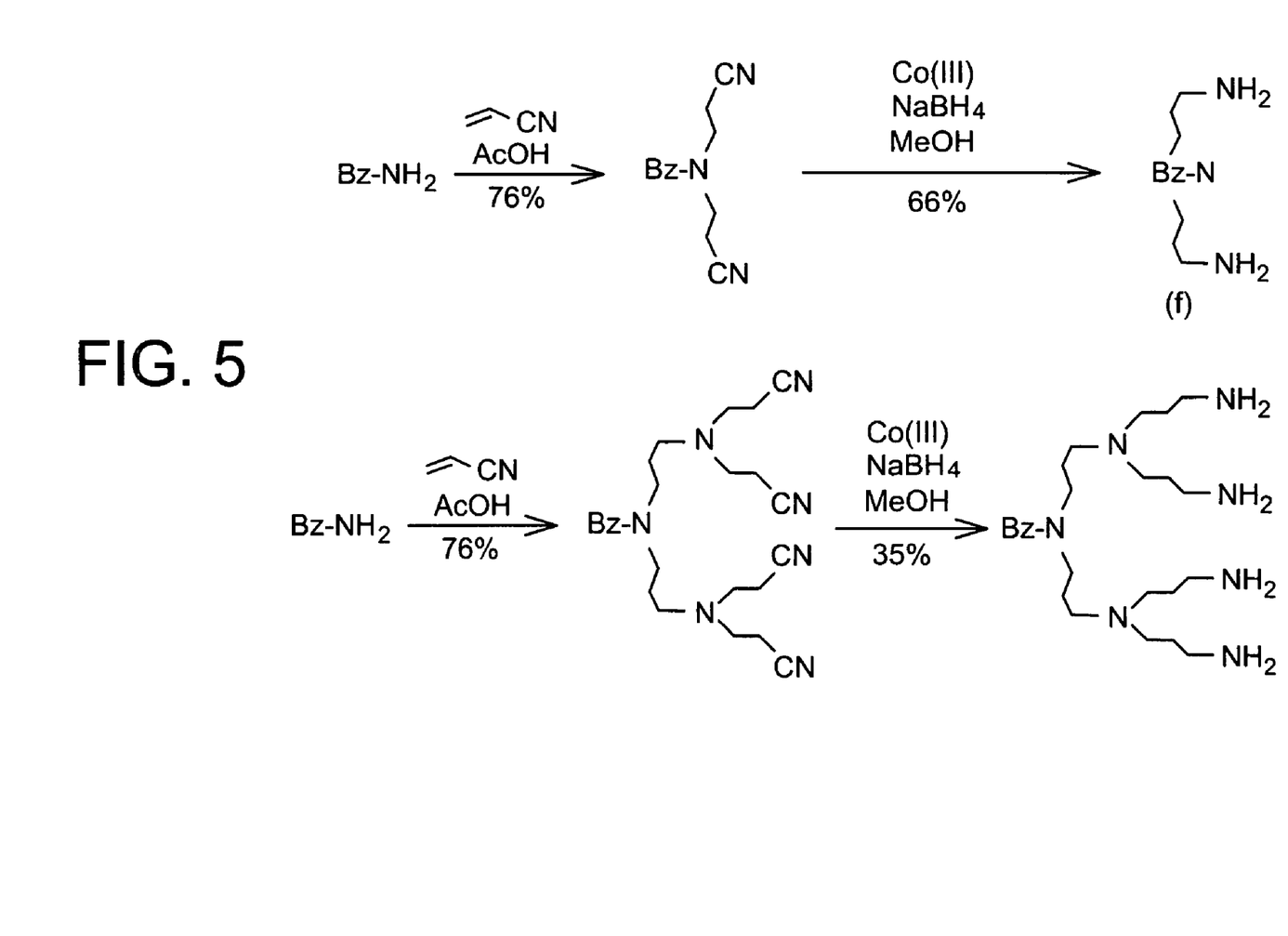

As regards the precursor base dendrimers for the dendrimers of the invention having a core of formula (I) and generations consisting of units of formula (IV), these may be commercially available or may be prepared using the synthesis scheme shown in FIG. 5 (for which $m_2$ is equal to 2).

This synthesis scheme comprises, in succession, the reaction of benzylamine (represented by Bz-NH$_2$ in FIG. 2) with acrylonitrile, followed by reduction of the nitrile functional groups to —CH$_2$—NH$_2$ functional groups by the action of sodium borohydride in the presence of a cobalt (III)-based catalyst in order to obtain compound (f). These reactions are repeated as many times as the number of generations that it is desired to obtain.

It should be noted that the Bz-N-type core undergoes debenzylation (not shown in the figure), it being possible for the NH group thus liberated to again react with acrylontrile followed by a reduction, so as to form a dendrimer with a core of formula (I) and generations consisting of units of formula (IV), the last generation having —NH$_2$ functional groups as terminal functional groups.

The dendrimers according to the present invention may be used to extract at least one metal chosen from actinides and possibly lanthanides present in an aqueous solution, especially an acid solution such as the solutions for dissolving irradiated fuels and aqueous effluents coming from spent nuclear fuel reprocessing plants. In particular, these metals may be americium and curium.

The aqueous solution containing at least one of these metals may be a nitric solution containing 1 to 5 mol/l of HNO$_3$.

To employ the extraction method according to the invention, the aqueous solution containing the metal or metals to be separated is brought into contact with at least one dendrimer of the invention, preferably by dissolving the latter in the aqueous solution, followed by a separation step so as to separate the dendrimer or dendrimers that have trapped the metal or metals of the said aqueous solution. Preferably, this separation step is carried out by filtering the aqueous solution on a filter, the dendrimers that have fixed the metal or metals remaining on the filter and the solution passing through the pores of the filter simply through the action of the gravitational force. The separation step may also be carried out by ultrafiltration which consists, in addition to the action of the simple force of gravity, in exerting a pressure gradient in order to speed up the filtration process.

It should be noted that these steps (contacting and separation) may be repeated several times so as to improve the extraction of the metal or metals from the aqueous phase.

The first step of the method (i.e. the contacting of the dendrimer with the aqueous solution to be treated) consists in dissolving at least one dendrimer of the invention in the aqueous solution by adding the said dendrimer directly to the solution. Dissolution may be facilitated, for example, by ultrasonication.

Next, the separation of the dendrimer or dendrimers that have fixed the metals or metals to be separated preferably takes place by ultrafiltration or by simple filtration of the aqueous solution on a suitable filter (or membrane), the size of the dendrimers being such that they remain trapped in the pores of the filter used for the separation.

The ultrafiltration consists, through the action for example of a pressure gradient, in separating, by using porous filters (for example having pore diameters of 0.22 to 5 µm), the aqueous phase from the dendrimers that have fixed at least some of the metal or metals initially present in the aqueous phase.

Depending on the size of the dendrimer to be separated, it is possible to use filters having pore sizes of greater than 5 µm, or filters having pore sizes of 0.01 to 5 µm, or filters having pore sizes of 0.001 to 0.01 µm.

These filters of very low porosity may be polypropylene, polyvinylidene fluoride or polyfluoroethylene membranes, but also mineral membranes.

This extraction method is particularly advantageous because it is very simple to implement, owing to the fact that it does not require the use of liquid/liquid extraction techniques such as pulsed columns or batteries of centrifuge extractors, which have to be nuclearized, as is the case for the conventional extraction methods.

Other features and advantages of the invention will become more clearly apparent upon reading the following examples, which of course are given by way of illustration but are not limiting.

DETAILED DESCRIPTION OF PARTICULAR EMBODIMENTS

Examples 1 to 3 illustrate the preparation of dendrimers according to the present invention.

Examples 4 to 6 illustrate the use of dendrimers according to the present invention for extracting actinide and lanthanide metals.

Example 1

Example 1 illustrates the preparation of a dendrimer having an external layer consisting of units of formula (I) with R$^1$ and R$^2$ representing phenyl groups, a core of formula:

and two to five generations consisting of units of formula:

The 4th generation dendrimer is shown in FIG. 2.

All the preparations described below start with base dendrimers having, as terminal functional groups, —NH$_2$ functional groups, these dendrimers being sold by Aldrich under the following product names:

polypropyleneimine octaamine;
polypropyleneimine hexacontamine;
polypropyleneimine dotriacontamine; and
polypropyleneimine tetrahexacontamine.

a) Preparation of a dendrimer having two generations (2nd generation dendrimer) and an external layer consisting of a ring of eight units of formula (I).

A solution of 110 mg of polypropyleneimine octaamine dendrimer (sold by Aldrich under the reference DAB-Am-8) and 1 ml of triethylamine in 20 ml of chloroform were added to a solution of 600 mg of the active ester p-nitrophenyl (diphenylphosphoryl) acetate in 10 ml of chloroform. The reaction mixture was stirred for several days at room temperature. The mixture was then extracted three times with concentrated aqueous ammonia. The organic phases were dried with magnesium sulphate and evaporated to almost dryness. Hexane was added to the residue obtained, after which a precipitate formed. The precipitate was filtered and then dried. 300 mg of solid corresponding to the final product were obtained, i.e. a yield of 81%.

The characteristics of this product were the following:

$^1$H-NMR (200 MHz, CDCl$_3$, δ: 7.98 (br t, 8H, NH), 7.8-7.65 (m, 32H, H phenyl), 7.5-7.3 (m, 48H, H phenyl), 3.40 (d, J=13.7 Hz, 16H, CH$_2$), 3.10 (m, 16H, CH$_2$), 2.40-2.00 (m, 36H, CH$_2$), 1.50-1.20 (m, 28H, CH$_2$).

b) Preparation of dendrimers comprising three generations (3rd-generation dendrimer), four generations (4th-generation dendrimer) and five generations (5th-generation dendrimer).

The following operating method was applied in order to prepare the various dendrimers mentioned above.

A solution of 550 mg of the active ester p-nitrophenyl (diphenylphosphoryl) acetate in 10 ml of chloroform was added to a solution of 110 mg of suitable dendrimer dissolved in 20 ml of chloroform and 1 ml of triethylamine. The reaction mixture was stirred for several days (up to one week) at room temperature.

During this operation, the reaction mixture became yellow. Next, this reaction mixture was extracted three times with a concentrated aqueous ammonia solution. The ammonium phases were dried with magnesium sulphate and evaporated. The oily residue was dissolved in about 10 ml of chloroform and then 40 ml of toluene. The mixture obtained was again evaporated. To completely remove the triethylamine, the operation (addition of chloroform+toluene and evaporation) was repeated four times. Finally, after these operations, the residue was dissolved in chloroform and then hexane added. The precipitate obtained was filtered and then dried.

To synthesize the 3rd-generation dendrimer, the base dendrimer for the synthesis was polypropyleneimine hexacontamine (sold by Aldrich under the reference DAB-Am-16).

To synthesize the 4th-generation dendrimer, the base dendrimer for the synthesis was polypropyleneimine dotriacontamine (sold by Aldrich under the reference DAB-Am-32).

To synthesize the 5th-generation dendrimer, the base dendrimer for the synthesis was polypropyleneimine tetrahexacontamine (sold by Aldrich under the reference DAB-Am-64).

The characteristics of the compounds were the following:

in the case of the 3rd-generation dendrimer:

Yield: 58% (190 mg)

$^1$H-NMR (200 MHz, CDCl$_3$), δ: 8.01 (br s, 16H, NH), 7.8-7.65 (m, 64H, H phenyl), 7.5-7.3 (m, 96H, H phenyl), 3.40 (d, J=13.6 Hz, 32H, CH$_2$), 3.09 (m, 32H, CH$_2$) 2.80-2.00 (m, 36H, CH$_2$), 1.50-1.20 (br s, 28H, CH$_2$);

in the case of the fourth-generation dendrimer:

Yield: 73% (240 mg)

$^1$H-NMR (200 MHz, CDCl$_3$), δ: 8.15 (br s, 32H, NH), 7.8-7.65 (m, 128H, H phenyl), 7.5-7.3 (m, 192H, H phenyl), 3.43 (d, J=13.6 Hz, 64H, CH$_2$), 3.07 (m, 64H, CH$_2$), 2.50-2.00 (m, 180H, CH$_2$), 1.50-1.20 (br s, 124H, CH$_2$); and as regards the fifth-generation dendrimer:

Yield: 60% (190 mg)

$^1$H NMR (200 MHz, CDCl$_3$), δ: 8.21 (br s, 64H, NH), 7.8-7.65 (m, 256H, H phenyl), 7.5-7.3 (m, 384H, H phenyl), 3.43 (d, J=13.6 Hz, 128H, CH$_2$), 3.06 (m, 128H, CH$_2$), 2.50-2.00 (m, 372H, CH$_2$), 1.50-1.20 (br s, 256H, CH$_2$).

Example 2

Example 2 illustrates the preparation of dendrimers having an external layer consisting of units of formula (I) with R$^1$ and R$^2$ representing phenyl groups, a core of formula:

and 4 to 5 generations consisting of the following units:

The 3rd-generation PAMAM-type dendrimer is shown in FIG. 4.

a) Preparation of a 4th-Generation PAMAM Dendrimer.

A solution of 700 mg of p-nitrophenyl(diphenyl-phosphoryl) acetate active ester in 35 ml of chloroform was added to a solution of 350 mg of base (4th-generation) dendrimer having an external layer comprising 32 NH$_2$ functional groups and 120 mg of triethylamine in 35 ml of chloroform. The pale yellow solution obtained was stirred for 2.5 days at room temperature. Next, the said solution was extracted four times with a 10% sodium hydroxide solution. The organic phases were dried with magnesium sulphate and evaporated. The oily residue obtained was precipitated from chloroform in hexane. A white powder was obtained, this being collected by filtration and then dried.

The characteristics of the compounds were the following: yield: 6.7% (55 mg).

b) Preparation of a 5-th Generation PAMAM Dendrimer.

A solution of 600 mg of p-nitrophenyl(diphenyl-phosphoryl) acetate active ester in 15 ml of chloroform was added to a solution of 215 mg of base (5th-generation) dendrimer, having, as external layer, 64 —NH$_2$ amino functional groups and 210 mg of triethylamine in 35 ml of chloroform. The pale yellow solution obtained was stirred for 2.5 days at room temperature. The said solution was then extracted four times with a 10% sodium hydroxide solution. The organic phases were dried with magnesium sulphate and evaporated. The oily residue obtained was precipitated from chloroform in hexane. A white powder was obtained, this being collected by filtration and then dried.

The characteristics of the compounds were the following: yield: 16% (72 mg).

Example 3

In this example, the effectiveness of a dendrimer of Example 1, corresponding to the 4th-generation dendrimer, was evaluated for separating europium from an aqueous solution containing that element.

For this purpose, two tests at different dendrimer concentrations (10$^{-5}$ mol/l and 2.5×10$^{-5}$ mol/l) were carried out.

For each of the tests, the dendrimer was dissolved in a beaker containing the aqueous europium-containing phase (the rate of dissolution was able to be increased by subjecting the solution to an ultrasonic treatment).

Next, this solution was filtered, the dendrimer having fixed part of the europium remaining absorbed on the filter. The filtrate obtained was again brought into contact with a predetermined mass of dendrimer followed by a filtration.

These operations were repeated three times.

After each filtration, the europium concentration of the filtrate was determined by γ-spectroscopy or liquid scintillation.

Next, the europium distribution coefficient was determined in the following manner, this coefficient being calculated on the basis of the difference in activity of the solution before and after:

$$Kd = \frac{(C_{in} - C_{fin})}{C_{in}} \times \frac{V}{M_{ext}}.$$

where:

$C_{in}$ is the europium concentration of the solution (or filtrate) before the dendrimer is dissolved;

$C_{fin}$ is the europium concentration after the dendrimer has been dissolved and filtered;

V is the volume of the solution; and $M_{ext}$ is the mass of dendrimer dissolved.

The results are given in the following table:

| Dendrimer concentration | $10^{-5}$ mol/l | $2.5 \times 10^{-5}$ mol/l |
|---|---|---|
| $K_d$, 1st filtrate | 1570 | 1160 |
| $K_d$, 2nd filtrate | 1700 | 1720 |
| $K_d$, 3rd filtrate | 2170 | 1790 |

This table shows that $K_d$ increases with the number of dissolution/filtration operations, thereby demonstrating the capability of the dendrimers of the invention to separate europium from an aqueous phase, even in the case in which the europium is present in trace amount in the nitric solution.

Example 4

In this example, the effectiveness of the dendrimers prepared according to Example 1 for separating europium and americium from solutions containing these two elements was evaluated, the nitric acidity of the solutions being 3 mol/l.

Dendrimers (of 2nd, 3rd, 4th and 5th generation respectively) having various concentrations were brought into contact, in the same manner as in the previous example, with a solution containing the various aforementioned elements, this operation being followed by a filtration and the said operations being repeated at least twice.

The europium and americium distribution coefficients and the americium-to-europium selectivity coefficient were determined in the same manner as in the previous example.

The test results are given in the table below.

| | | Aqueous phase: 3M HNO₃ + dendrimer | | | |
|---|---|---|---|---|---|
| Dendrimer | Conc (M) | | 1st filtration | 2nd filtration | 3rd filtration |
| 2nd generation | $10^{-4}$ | $K_{d\,Eu}$ | 1170 | 1200 | 970 |
| 3rd generation | $10^{-5}$ | $K_{d\,Eu}$ | 1090 | 1380 | 1050 |
| | | $K_{d\,Am}$ | 2820 | 4240 | 2830 |
| | | $S_{Am/Eu}$ | 2.59 | 3.07 | 2.7 |
| 4th generation | $10^{-5}$ | $K_{d\,Eu}$ | 1510 | 920 | 2600 |
| | | $K_{d\,Am}$ | 3370 | 2120 | 4860 |
| | | $S_{Am/Eu}$ | 2.23 | 2.31 | 1.87 |
| 5th generation | $5 \times 10^{-6}$ | $K_{d\,Eu}$ | 1070 | 2280 | 1790 |
| | | $K_{d\,Am}$ | 1070 | 2280 | 1790 |
| | | $S_{Am/Eu}$ | 3.08 | 2.09 | 2.83 |

As in the previous test, this shows the effectiveness of the dendrimers in very low concentration for eliminating americium and to a lesser extent europium, these themselves being present in trace amount. It may also be seen that a certain Am/Eu selectivity remains independent of the concentration of the cations in solution.

Example 5

In this example, the effectiveness of dendrimers prepared according to Example 2 for extracting Eu and Am from 3M HNO₃ solutions was evaluated. The extraction protocol was the same as that described in Examples 3 and 4.

The results are given in the following table.

| Conc. dendrimer | | 1st filtration | 2nd filtration | 3rd filtration | 4th filtration |
|---|---|---|---|---|---|
| 4th generation PAMAM | $7.9 \times 10^{-6}$ $K_{dEu}$ | 1250 | 1820 | 1670 | 1400 |
| | $K_{dAm}$ | 2150 | 3050 | 2840 | 2020 |
| 5th generation PAMAM | $7.9 \times 10^{-6}$ $K_{dEu}$ | 1500 | 1350 | 1660 | 1140 |
| | $K_{dAm}$ | 1860 | 2960 | 2770 | 1580 |

The performance of these CMPO PAMAM dendrimers is very similar to those obtained in Example 4.

Example 6

In this example, the effectiveness of dendrimers grafted onto silica particles for extracting Eu and Am from a 3M HNO₃ solution with 300 mg of particles carrying the dendrimer shown below, covalently bonded to the particle, was evaluated.

The dendrimer used was a dendrimer of the following formula:

The particles onto which this dendrimer was grafted were particles functionalized by —CO$_2$H groups in order to give, after the —CO$_2$H group had reacted with the —NH$_2$ of the dendrimer, a grafted dendrimer corresponding to the formula:

Particle —CO—NH—(CH$_2$)$_3$—N[(CH$_2$)$_2$—NH]$_2$—CO—CH$_2$P(O)Ph$_2$.

The extraction protocol was the same as that described in Examples 3 and 4.

The results were the following:

K$_{d\ Eu}$: 57 K$_{d\ Am}$: 132.

These results demonstrate that the dendrimers of this example are capable of extracting both europium and americium, with a certain selectivity with respect to americium.

The invention claimed is:

1. Phosphorus-containing dendrimer comprising a core, at least one generation and an external layer consisting, completely or partly, of identical or different units, said units satisfying the following formula (I):

(I)

in which R$^1$ and R$^2$, which may be identical or different, are alkyl, alkoxy, or aryl groups, said dendrimer being grafted onto a functionalized mineral particle, said functionalized mineral particle being a silica particle having, before said grafting, one or more groups on its surface that are chosen from —CO$_2$H, dichlorotriazinyl, and epoxide groups.

2. Dendrimer according to claim 1, in which the core consists of a unit satisfying one of the following formulae, (II) or (III):

(II)

(III)

in which m$_1$ is an integer ranging from 2 to 4, and having n generations consisting of identical or different units, n being an integer ranging from 1 to 10, the said units satisfying the following formula (IV):

(IV)

in which:

m$_2$ is an integer ranging from 1 to 4;

when n is greater than 1, R$^3$ represents a single bond as regards the (n–1) first generations and represents a hydrogen atom as regards the n$^{th}$ generation; and when n is equal to 1, R$^3$ a hydrogen atom.

3. Dendrimer according to claim 1, in which the core consists of a unit satisfying the following formula (II):

(II)

and having n generations consisting of identical or different units satisfying the following formula (V):

(V)

in which:

m$_3$ is an integer ranging from 2 to 5;

m$_4$ is an integer ranging from 2 to 5;

when n is greater than 1, R$^1$ is a single bond as regards the (n–1) first generations and a hydrogen bond as regards the n$^{th}$ generation; and when n is equal to 1, R$^1$ represents a hydrogen atom.

4. Phosphorus-containing dendrimer according to claim 1, in which R$^1$ and R$^2$ represent phenyl groups.

5. Phosphorus-containing dendrimer according to claim 1, in which R$^1$ and R$^2$ represent an alkoxy group having from 1 to 18 carbon atoms.

6. Method of preparing a phosphorus-containing dendrimer, said dendrimer comprising a core, at least one generation and an external layer consisting, completely or partly, of identical or different units, said units satisfying the following formula (I):

(I)

in which R$^1$ and R$^2$, which may be identical or different, are alkyl, alkoxy, or aryl groups, said method including a step consisting in making a base dendrimer react with the compound of the following formula (VI):

(VI)

in which $R^1$ and $R^2$ are as defined in claim 1, $R^5$ represents H, a p-nitrophenyl group or a 2,4-dinitrophenyl group, said base dendrimer including an external layer consisting of units having a terminal functional group capable of reacting with said compound of formula (VI) in which the reaction between the base dendrimer and the compound of formula (VI) is carried out on a support which is in the form of silica particles having one or more groups on its surface that are chosen from —$CO_2H$, dichlorotriazinyl, and epoxyde groups.

7. Method of preparation according to claim 6, in which the terminal functional group capable of reacting with the compound of formula (VI) is an $NH_2$ functional group.

8. Method of preparation according to claim 6, in which the reaction between the base dendrimer and the compound of formula (VI) is carried out in the presence of a catalyst and optionally of a coupling activator.

9. Method according to claim 8, in which the catalyst is triethylamine.

10. Method according to claim 8, in which the coupling activator is dicyclohexylcarbodiimide.

11. Method for extracting at least one metal chosen from actinides and/or lanthanides present in an aqueous solution, said method comprising, in succession, a step of bringing the aqueous solution into contact with at least one phosphorus-containing dendrimer comprising a core, at least one generation, and an external layer consisting, completely or partly, of identical or different units, the said units satisfying the following formula (I):

(I)

in which $R^1$ and $R^2$, which may be identical or different, are alkyl, alkoxy, or aryl groups, said dendrimer being grafted onto a functionalized mineral particle, said functionalized mineral particle being a silica particle having, before said grafting, one or more groups on its surface that are chosen from —$CO_2H$, dichlorotriazinyl, and epoxyde groups, followed by a separation step so as to separate the dendrimer or dendrimers that has or have trapped the metal(s) of the aqueous solution.

12. Method according to claim 11, in which the step of bringing the dendrimer into contact with the aqueous solution containing the metal or metals to be extracted is carried out by dissolving the said dendrimer in the said solution.

13. Method according to claim 11, in which the separation step is carried out by filtering the solution on a filter, the dendrimer having fixed the metal or metals remaining on the filter.

* * * * *